United States Patent
Clark

(10) Patent No.: US 7,450,057 B2
(45) Date of Patent: Nov. 11, 2008

(54) SIGNAL PROCESSING FOR ACCELERATING MOVING TARGETS

(75) Inventor: David Charles Clark, Long Beach, CA (US)

(73) Assignee: Northrop Grumman Space & Missions Systems Corp., Los Angeles, CA (US)

( * ) Notice: Subject to any disclaimer, the term of this patent is extended or adjusted under 35 U.S.C. 154(b) by 203 days.

(21) Appl. No.: 11/584,212

(22) Filed: Oct. 20, 2006

(65) Prior Publication Data

US 2008/0174475 A1    Jul. 24, 2008

(51) Int. Cl.
*G01S 13/52* (2006.01)
*G01S 13/00* (2006.01)

(52) U.S. Cl. .................. 342/160; 342/196

(58) Field of Classification Search ........... 342/25 B, 342/25 R, 25 F, 70, 106, 107, 109, 115, 159–162, 342/175, 195, 196
See application file for complete search history.

(56) References Cited

U.S. PATENT DOCUMENTS

| | | | |
|---|---|---|---|
| 5,235,338 A * | 8/1993 | Hsiao et al. | 342/109 |
| 5,784,026 A * | 7/1998 | Smith et al. | 342/160 |
| 6,538,599 B1 * | 3/2003 | David | 342/196 |

OTHER PUBLICATIONS

Fast pulse Doppler radar processing accounting for range bin migration T.L. Marzetta; E.A. Martinsen; C.P. Plum; Radar Conference, 1993., Record of the 1993 IEEE National pp. 264-268.*

* cited by examiner

*Primary Examiner*—Thomas H. Tarcza
*Assistant Examiner*—Peter M Bythrow
(74) *Attorney, Agent, or Firm*—Patti, Hewitt & Arezina LLC

(57) ABSTRACT

A method for performing signal processing for accelerating moving targets, in one implementation, encompasses a method for performing coherent integration of pulses within a CPI for SMTI radar. In an embodiment, the method comprises the steps of determining the Fast Fourier Transform (FFT) for each pulse, and multiplying the FFT by a pulse compression reference function. The method then proceeds by shifting phase of the pulse-compressed FFT by applying a first factor derived from a ground reference point and a second factor derived from a velocity-acceleration hypothesis to provide phase-shifted data, shifting the envelope of the phase-shifted data by applying one factor derived from range history and a second factor derived from a velocity-acceleration hypothesis to provide aligned data, and determining the Inverse FFT for the aligned data to provide a set of target data of the form $H(p,i_1,i_2,i_3)$, where p is CPI number, $i_1$ is range index, $i_2$ is velocity index, and $i_3$ is coarse acceleration index, the latter three indices each referenced to the starting time of the first CPI. In a further embodiment, the invention encompasses first performing coherent integration for each CPI within a dwell of CPIs, then performing non-coherent integration in an efficient way, taking full advantage of the alignment to the starting time of the first CPI.

25 Claims, 5 Drawing Sheets

SIGNAL PROCESSING FOR ACCELERATING MOVING TARGETS

BACKGROUND

Surface Moving Target Indication (SMTI) radar detects and tracks moving objects on land or water. Accelerating targets, however, have a tendency to appear in range-Doppler maps as streaks. It is desirable to minimize this streaking, concentrating target energy and hence improving target detectability.

SUMMARY

The invention in one implementation encompasses a method for processing pulses within a CPI for SMTI radar. In an embodiment, the method comprises the steps of determining the Fast Fourier Transform (FFT) for each pulse, and multiplying the FFT by a pulse compression reference function. The method then proceeds by shifting phase of the pulse-compressed FFT by applying a first factor derived from a ground reference point and a second factor derived from a velocity-acceleration hypothesis to provide phase-shifted data, shifting the envelope of the phase-shifted data by applying one factor derived from range history and a second factor derived from a velocity-acceleration hypothesis to provide aligned data, and determining the Inverse FFT for the aligned data to provide a set of target data of the form $H(p,i_1,i_2,i_3)$, where p is CPI number, $i_1$ is range index, $i_2$ is velocity index, and $i_3$ is coarse acceleration index. In a further embodiment, the invention encompasses performing coherent integration for each CPI within a dwell of CPIs.

The invention in another implementation encompasses an SMTI radar system. In an embodiment, the SMTI radar system comprises means for performing coherent integration for each CPI within the dwell to provide an output of the form $H(p,i_1,i_2,i_3)$, where p is CPI number, $i_1$ is range index, $i_2$ is velocity index, and $i_3$ is coarse acceleration index, and means for performing a non-coherent integration by summing power over all CPIs in the dwell.

DETAILED DESCRIPTION

Figure 1:
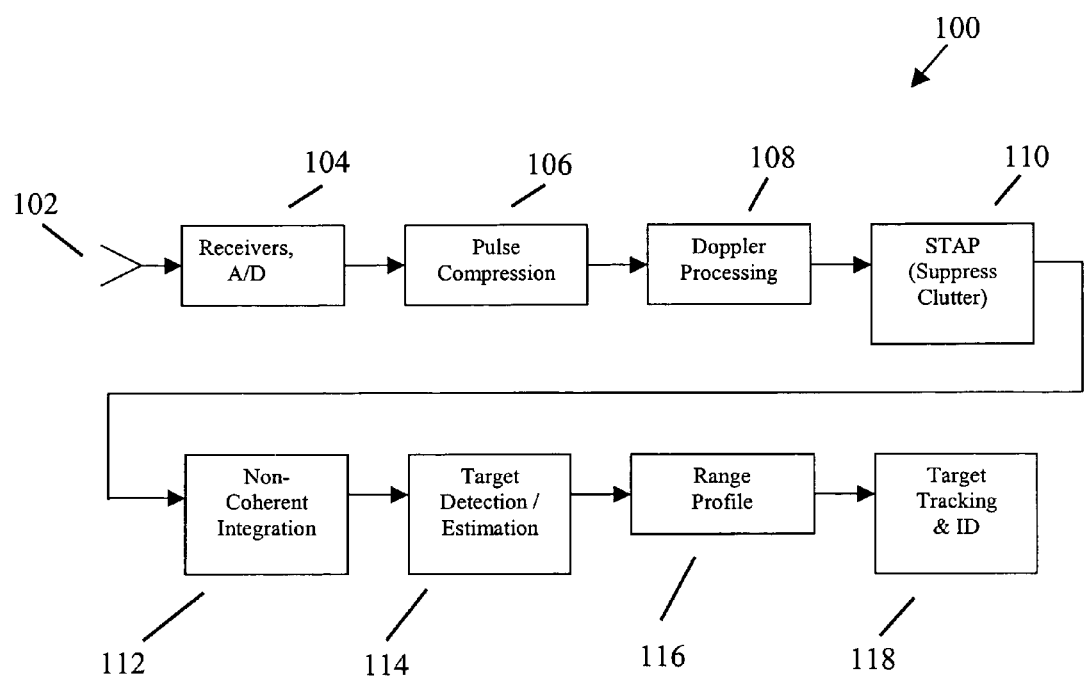
FIG. 1 is a simplified block diagram of a conventional MTI processing chain.

An efficient algorithm is desirable for processing MTI radar data for a single coherent processing interval (CPI) of data. The algorithm should focus targets by range and range-rate while mitigating the "range-walk" problem introduced by pulse-to-pulse phase error. An extension of the algorithm may process multiple CPIs of data by non-coherent integration.

The algorithm for processing a single CPI of data provides a method of focusing the data, doing so by shifting the phase and envelope of returning radar pulses so as to "line up" with each other. This alignment is dependent upon velocity hypotheses for hypothetical targets, leading to a calculation for each hypothesis. However, the total amount of calculation is reduced to practicality by use of the Chirp-z Transform.

The extension of the algorithm to processing multiple CPIs (a dwell) of data addresses the problem of how to make the processed results from different CPIs line up with each other. Since the resolution in velocity is fairly fine, the acceleration of realistically occurring targets should also be taken into account, both over the duration of single CPIs and over the total duration of the dwell. A small number of coarsely-spaced acceleration hypotheses are employed for coherent processing of single CPIs, but a larger number of finely-spaced acceleration hypotheses is necessary for non-coherent processing of the dwell. However, a way has been found to make the latter processing extremely efficient, taking up only a moderate part of the total processing load. The acceleration hypotheses are collapsed to one by choosing that which maximizes energy.

The method described herein has performance advantages, in that (1) it enables moving target focus in terms of almost eliminating "range-walk" due to target velocity, i.e., the target moving through a range resolution cell, during a CPI and also during a dwell; (2) it enables moving target focus in terms of accounting for most of the target acceleration during a CPI and, more importantly, during a dwell; (3) it provides for direct indexing of range/velocity resolution cells that belong together in different CPIs, doing so for all the acceleration hypotheses, so that the right cells may easily be added together for non-coherent integration; and (4) it eliminates the difficulties with interpolation that may be experienced with the Keystone Transform due to short CPIs (relatively few pulses).

The inventive technique mitigates a number of significant signal-to-interference processing losses. There is also a cost advantage, in that the inventive technique provides an efficient algorithm to perform coherent integration and an especially efficient algorithm to perform non-coherent integration.

The Keystone Transform, mentioned briefly above, is a technique that has only been contemplated to aid coherent integration of MTI radar signals, i.e., integration of radar signals over individual coherent processing intervals (CPIs), each CPI consisting of a series of radar pulses. A separate non-coherent integration technique must then be applied to achieve power integration of the results produced by coherent integration. The algorithm described herein, however, applies to mitigate the range walk problem for both coherent integration and non-coherent integration.

The Keystone Transform is a known technique for processing SAR (synthetic aperture radar) data. The same technique could be contemplated for processing MTI radar data on individual CPIs, but the technique has not at this point actually been applied in the MTI context. The anticipated shortcomings of the technique for MTI have to do with the fact that a CPI of MTI data will be much shorter than one for SAR data. For example, the duration of a CPI of MTI data might be 0.1 second or even substantially less, while the duration of a CPI of SAR data might be several seconds. This has consequences for the accuracy of mathematical approximations used by the Keystone Transform.

The heart of the Keystone Transform amounts to an interpolation between pulses to achieve a rescaling of "slow time". Each pulse of data ("fast time") has first been Fourier transformed, yielding frequency components of the signal, and there is a separate rescaling for each frequency component. A number of algorithms involving similar interpolation problems have been used in the SAR processing community, and experience has shown that interpolation must be carefully to avoid artifacts in the processing output.

For MTI data, the interpolation would be done on relatively short sequences, because there are much fewer pulses in a CPI, and so the lesser accuracy of polynomial interpolation/ extrapolation near the ends of the sequences can be expected to have a greater detrimental effect than would be the case for SAR data. The interpolation may be replaced by a Fourier transform technique, but this also suffers from the relative shortness of the sequence of pulses. An approximation can be applied such that the digital Fourier transform of a "chirp signal" has approximately the same mathematical form as a chirp signal, but the quality of this approximation suffers greatly as the length of the sequence being Fourier transformed decreases. Hence, this technique does not seem advantageously applicable to MTI.

FIG. 1 is a simplified block diagram of a conventional MTI processing chain 100. The processing stream represented in FIG. 1 has been simplified by combining some details into single blocks, and by eliminating some processing details associated with rejecting radio frequency interference (RFI). At the front end of the processing chain 100 there is a set of receivers 104, designed to process an input signal 102 from each antenna sub-array (not shown in FIG. 1), and with each receiver 104 there is an analog-to-digital (A/D) converter.

The output signal from the A/D converter 104 is applied to conventional MTI pulse compression 106 and Doppler processing 108. It should be noted that the processing scheme described subsequently differs from the conventional in that the resolution cells produced are three-dimensional, comprising range/range-rate/range-acceleration cells (or hypotheses), rather than merely range-Doppler resolution cells. Moreover, these cells are referenced to the starting time of the dwell (total data collection period) rather than to the starting times of separate coherent processing intervals (CPIs) within the dwell, which facilitates the later non-coherent integration step (NCI). The inventive process mitigates both target range walk within CPIs, which may or may not be done in conventional MTI, and target range walk across CPIs.

The next block in a conventional MTI processing chain 100 is Space-Time Adaptive Processing (STAP) 110. Even in the algorithm described herein, STAP 110 is largely carried out in a conventional fashion. It is desirable in the inventive process that a STAP covariance matrix should be formed for every acceleration hypothesis, but there is an efficient way to do this by deriving the covariance matrices for all acceleration hypotheses from that for just one acceleration hypothesis.

Next, the signal is subjected to conventional NCI processing 112. NCI processing 112 within conventional MTI processing differs quite significantly from NCI processing as described for the inventive technique, beginning with the fact that the inventive process takes account of acceleration hypotheses. The remaining processing blocks in conventional MTI include Target Detection/Estimation 114, Range Profile 116, and Target Tracking & Identification 118, which relate to producing moving target detections from the data output from NCI 112, estimating locations of the targets, producing information that will help identify the targets, and tracking targets over the course of time.

The method described herein begins with a method for processing a single CPI of data that outputs a two-dimensional grid of SMTI resolution cells. The present invention extends that algorithm to process multiple CPIs in a dwell, including the proper alignment of resolution cells in each CPI, so that when non-coherent integration (NCI) is performed the intensities in corresponding resolution cells in each CPI are properly summed together.

Of course, there is the question of what are the corresponding resolution cells in different CPIs in light of several radial acceleration effects. For precision SAR, there is a deterministic variation of radial acceleration with range and cross-range which various algorithms try to account for in focusing stationary scatterers. In the case of SMTI, this deterministic variation is dominated by several indeterminate sources of radial acceleration for realistic moving targets, which is what should be focused reasonably well, rather than clutter. Herein, we discuss residual acceleration after removing the range history of a ground reference point.

The nature of accelerating moving targets makes it reasonable to introduce a set of range acceleration hypotheses. This might seem to increase the processing load, but on the other hand if one were to mitigate certain processing losses then there still may be savings in the overall processing load. In any case, there should be a benefit in more realistic modeling of targets, rather than basically assuming there is no target acceleration. The issue of what to do about acceleration is brought to the fore by consideration of NCI, because of the longer time duration of a dwell as opposed to a CPI.

There are also some related issues, one of which is the question of what the maximum acceleration hypothesis should be, as well as the increment between acceleration hypotheses. It turns out there should be two separate acceleration hypothesis increments to control two different straddling losses. One needs a coarse increment relating to coherent integration and a fine increment relating to NCI processing. Another issue is whether and how do processing acceleration hypotheses impact other parts of an SMTI radar processing chain, in particular STAP, detection and AOA (angle of arrival) estimation.

Figure 2:
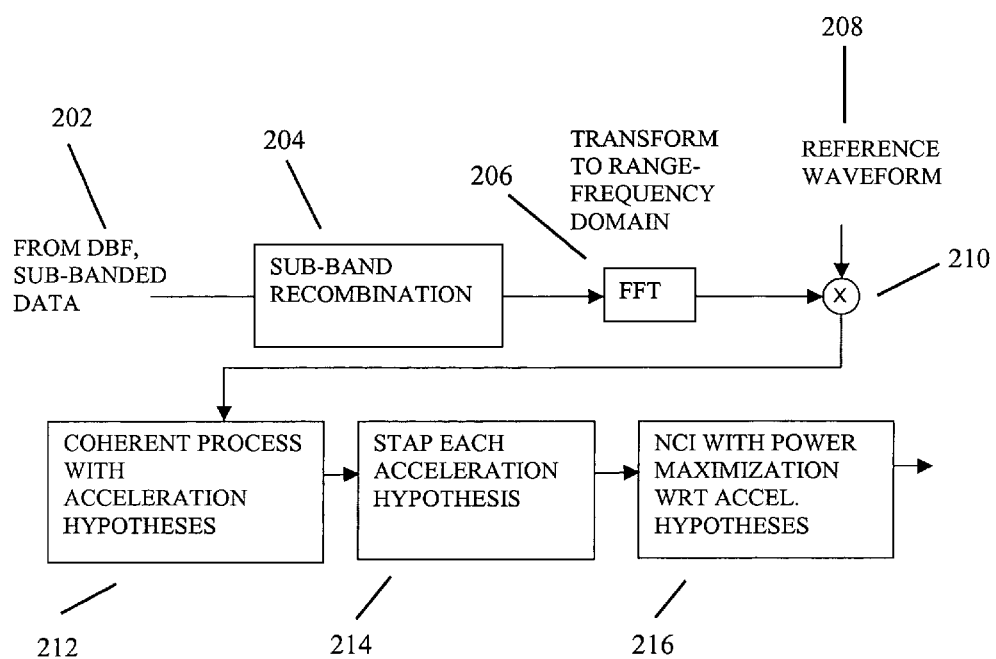
FIG. 2 is a block diagram illustrating part of the SMTI processing flow.

FIG. 2 is a block diagram for a hypothetical SMTI system. While sub-banded data plays an important role in digital beam forming (DBF) 202, sub-band recombination 204 takes place immediately afterward; hence, sub-banded data plays no role in the discussion of the inventive algorithm. However, other implementations might well put sub-band recombination later in the processing chain.

After sub-band recombination, data are transformed to the range-frequency domain by FFT (Fast Fourier Transform) 206 and multiplied 210 with a reference waveform 208. The resulting data are coherently processed with acceleration hypotheses 212, with STAP processing 214 applied to each acceleration hypothesis, then non-coherent integration 216 is introduced with power maximization with respect to the acceleration hypotheses.

The detailed discussion that follows first assesses the acceleration of ground points relative to that of a GRP (ground reference point), and by way of examples illustrates the point that target accelerations are likely to be larger than these differential accelerations of ground points. Next, equations modeling accelerating targets are presented and used to coherently integrate targets in each CPI over a grid of range/ range-rate/range acceleration hypotheses, and the discussion shows how the processed data from separate CPIs can be made to line up from one CPI to the next. The discussion illustrates how the processing utilizes the Chirp-z Transform (CZT) and considers acceleration hypotheses in connection with straddling losses for coherent integration. Modifications to STAP processing are then considered, but only briefly. The last section of the description below deals with NCI processing and straddling loss considerations. It is envisioned that maximization of the output energy from NCI with respect to the acceleration hypothesis should be performed. This will collapse one of the data indices; hence, there should be no increase in the volume of data output to the detection step. Other impacts on detection and AOA estimation are not considered herein.

Figure 3:
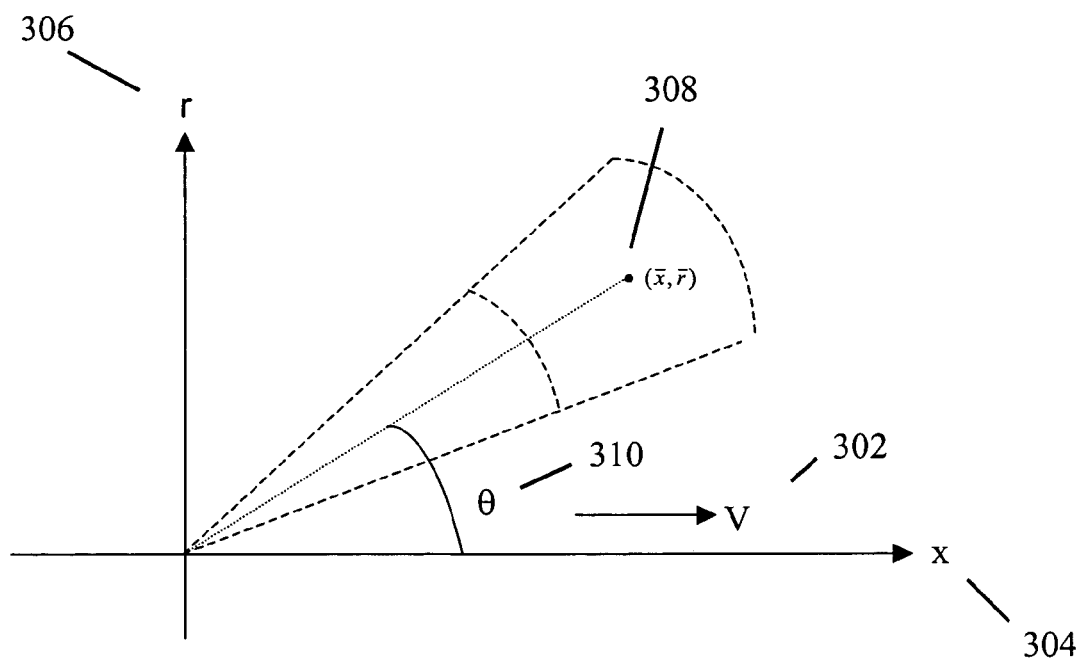
FIG. 3 illustrates basic geometry of a radar path and a ground reference point.

FIG. 3 illustrates basic geometry for the following discussion. The radar is moving with linear motion with a constant velocity V 302. Coordinates along the radar path and perpendicular to it are x 304 and r 306, respectively. Elapsed time in a dwell is denoted by t. There is a general point (x,r) in a slant plane, as well as a GRP $(\bar{x},\bar{r})$ 308, which initially at t=0 is at a Doppler cone angle θ 310. Each ray from the radar in the slant plane is a locus of constant radial velocity for fixed points. Each arc perpendicular to the rays represents constant range. The range of a point at (x,r) is given by $$R(x,r;t) = \sqrt{(x-Vt)^2 + r^2} \tag{1}$$

and of course this applies to the GRP. This provides a simple model for the range history of the GRP which could be used for simulation of our coherent integration algorithm, but more complex models could also be used, with essentially no effect on the description of the algorithm. For example, orbital curvature and earth rotation effects could be introduced.

To assess the variation of range acceleration of ground points over a footprint, consider the centrifugal acceleration of a point moving with constant speed v around a circle of radius R, which is $$\text{acceleration} = -\frac{v^2}{R} \tag{2}$$

The same equation with a reversal of sign applies to the radial acceleration of a ground point at broadside to a moving radar. For example, with a radar velocity of 7 km/sec and a range of 2000 km one would see an acceleration of 24.5 m/sec². Now if the range increases or decreases by 10 km, there is a change in acceleration of ±0.122 m/sec². There is also a change in acceleration if the ground point moves in cross-range. The change is essentially twice as much as for moving the same distance in range. Hence, if one moves 2 km in cross-range, the change in acceleration is about ±0.049 m/sec².

Following are some examples for acceleration of realistic moving targets. First, there is the acceleration of vehicles in ordinary traffic starting from zero velocity after a stop light changes. For example, a vehicle might accelerate from 0 to 20 m/sec (45 mph) in 10 sec, which would be an average acceleration of 2 m/sec². Another example is provided by traffic moving around a bend in a highway. Let a vehicle have a speed of 25 m/sec (56 mph) and the highway have a radius of curvature of 500 meters. Then, by (2), the centrifugal acceleration is 1.25 m/sec². If the same vehicle were to follow a circle of radius 500 meters all the way around it would take about 2 minutes. At this rate it would take about 15 seconds to traverse a bend in the highway of 45 degrees. Checking the map of Los Angeles, there are numerous bends in the freeways of about this magnitude, and one might estimate that 15 seconds, or less, is a realistic amount of time to traverse some of these bends.

In both of these examples one can readily appreciate that acceleration of realistic moving vehicles may easily dominate the residual acceleration referred to for ground points. This should be true even after taking account of the projection of acceleration onto the radar line of sight. A final example may be even more relevant than the two examples just mentioned, although the acceleration involved is smaller. Namely, consider a vehicle moving in cross-range. If the speed is 25 m/sec at a range of 2000 km, and the vehicle is moving in the same direction as the radar, then v is effectively reduced and the radial acceleration is reduced by 0.17 m/sec². This is comparable to the variation in ground point acceleration seen over the footprint.

Radar operators have regularly observed the streaking of moving targets in range-Doppler processed data. By employing range acceleration hypotheses, it should be possible to considerably reduce the streaking and thereby concentrate the target energy and increase detectability.

A range history model for movers is helpful in the subsequent discussion, utilizing the following notation:

$R(t)$=range history of a mover $R_G(t)$=range history of a ground reference point (GRP)

$$R_1(t) = R(t) - R_G(t) = \text{residual range history of the mover} \tag{3}$$

Then, regarding the residual range history, assume that the corresponding acceleration is constant for the dwell and let the initial range, initial range rate, and acceleration, as well as the range rate history $V_1(t)$, be represented by $$R_1(t) = R_0 + V_0 t + \frac{1}{2} A t^2 \tag{4}$$

$$V_1(t) = V_0 + At$$

Let there be a grid of values for initial range, initial range rate, and range acceleration hypotheses, each set of three values specifying a particular hypothetical moving target. The idea to be observed for coherent integration of each of multiple CPIs is that these hypothetical targets are to be followed across all CPIs, as well as within each individual CPI. Indices into the grid are given by $$R_0 = R_0(i_1), V_0 = V_0(i_2), A = A(i_3) \tag{5}$$

The range history of the target indexed by $i_1, i_2, i_3$ is then given by $$R(t; i_1, i_2, i_3) = R_G(t) + R_0(i_1) + V_0(i_2)t + \frac{1}{2}A(i_3)t^2 \tag{6}$$

There will be P CPIs, starting at times $t=t_p$, $p=0,1,\ldots,P-1$, where it convenient to assume that $t_0=0$. Each CPI has its own PRF (pulse repetition frequency) and number of pulses, but for notational simplicity the inter-pulse spacing and number of pulses will not be indexed. Then pulse receive times are given by $$t = t_p + n\Delta t, n = 0, 1, \ldots, N-1 \tag{7}$$

The basis for coherent integration is that the pulse compressed signal returned from a point scatterer has a phase, due to the heterodyning operation, and an envelope. Aside from the amplitude, this signal is of the form $$f(R') = \exp\left(-j\frac{4\pi}{\lambda}R\right)\text{sinc}\left(\frac{R'-R}{\Delta r}\right) \tag{8}$$

where R is the range to the scatterer and Δr is the range resolution. The range referred to here would be that associated with use of the so-called "start and stop approximation". Actually, in doing pulse compression the Doppler shift in the received signal due to the radar velocity should be taken into account, which is the kind of correction involved in "secondary range compression" (SRC). It is assumed herein that SRC tuned to the GRP is adequate and can be directly incorporated into the pulse compression reference function. The first and second factors on the right hand side of (8) are the phase factor and the envelope, respectively. R' corresponds to sampled values with constant phase indicated by the phase factor. The signal processing will presumably be linear, which means that the phase factor will be transferred to the output of the processing. One should note that processing steps to follow do not introduce any additional phase unless specifically arranged for. In particular, the FFT, inverse FFT, and pulse compression do not introduce phase.

The objective in coherent integration is to sum up the returns in each CPI from each hypothetical motive target, described above, so that the returns from each target sum together with the phase and the envelope properly aligned across the pulses. In accordance with the last remark of the preceding paragraph, separate steps are taken to align the phase and the envelope. Also, one would prefer that a hypothetical target corresponding to a set of index values $i_1, i_2, i_3$ on one CPI should correspond to the same index values on other CPIs in order to facilitate NCI. Actually, it turns out this objective needs to be modified because of the need for finer acceleration hypotheses for NCI than are needed for coherent integration.

Figure 4:
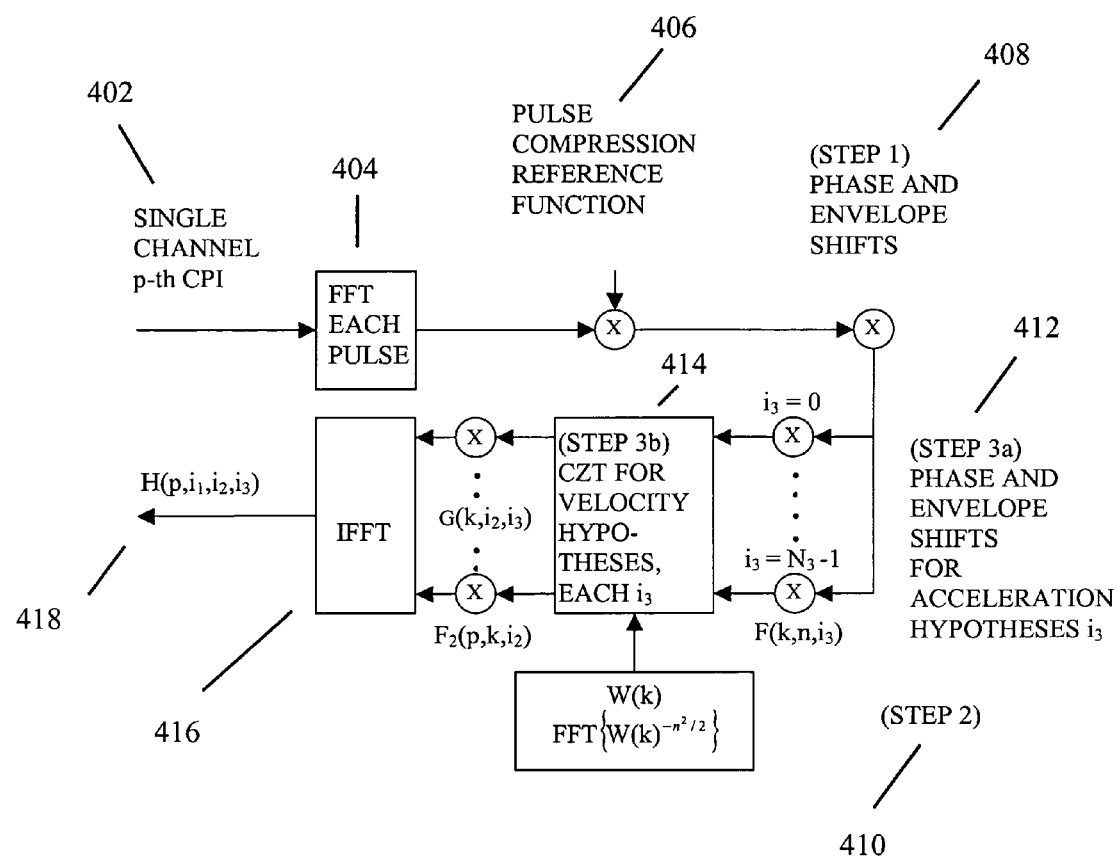
FIG. 4 is a block diagram outlining coherent integration for a single CPI.

The block diagram shown in FIG. 4 outlines coherent integration for a single CPI. As indicated, the first steps are to FFT 404 each pulse 402 and multiply by the conjugate of the transfer function of the transmitted chirp waveform 406, so as to achieve pulse compression when the inverse FFT 416 is eventually applied.

In order to add the returns from target $i_1, i_2, i_3$ in phase on the p-th CPI 402, the n-th return should have its phase shifted in proportion to $$R(t_p + n\Delta t; i_1, i_2, i_3) - R(t_p; i_1, i_2, i_3) = \quad (9)$$

$$R_G(t_p + n\Delta t) - R_G(t_p) + [V_0(i_2) + A(i_3)t_p]n\Delta t + \frac{1}{2}A(n\Delta t)^2$$

so as to match the phase of the target on the initial pulse of the CPI. But notice that index $i_1$ does not appear on the right hand side of (9). This means that the entire n-th pulse is phase-shifted by the same amount for velocity-acceleration hypothesis $i_2, i_3$. Thus, to carry out this phase shift it is sufficient to multiply the n-th pulse in the frequency domain and after pulse compression by $$\exp\left\{j\frac{4\pi}{\lambda}[R_G(t_p + n\Delta t) - R_G(t_p)]\right\} \exp \quad (10)$$

$$\left\{j\frac{4\pi}{\lambda}\left([V_0(i_2) + A(i_3)t_p]n\Delta t + \frac{1}{2}A(i_3)(n\Delta t)^2\right)\right\}$$

where the first factor indicates the phase shift for the GRP and the second factor indicates the velocity-acceleration hypothesis dependent part.

The envelope must also be shifted, not only to match the envelope on the initial pulse of the CPI, but also to achieve a match across the entire dwell for when we get to NCI. Thus, the envelope will be shifted to match the initial pulse in the dwell at time t=0. The amount of the shift in range is $$R(t_p + n\Delta t; i_1, i_2, i_3) - R(0; i_1, i_2, i_3) = R_G(t_p + n\Delta t) - \quad (11)$$

$$R_G(0) + V_0(i_2)(t_p + n\Delta t) + \frac{1}{2}A(i_3)(t_p^2 + 2t_p n\Delta t + (n\Delta t)^2)$$

The shift in (11) is translated to range samples by dividing by s, the sampling interval in range. In general, this shift will amount to a fractional number of samples, which will require interpolation. The data is already in the frequency domain, so the required fractional shift may be carried out using the following lemma.

Lemma. Let f(m), m=0,1, . . . ,M−1, be a complex-valued, over-sampled sequence of values from a continuous function, where M is even, and let F(k) be its Fourier Transform. For any real value α define $$\hat{F}(k) = \begin{cases} F(k)\exp(j2\pi\alpha k/M), & k = 0, \dots, M/2-1 \\ F(k)\exp(j2\pi\alpha(k-M)/M), & k = M/2, \dots, M-1 \end{cases} \quad (12)$$

Then one has interpolated values, with a circular wrap around if necessary, given by the inverse Fourier Transform $$f(m+\alpha) = IFT(\hat{F}(k)), m=0,1 \dots ,M-1 \quad (13)$$

The parameter α of the lemma is identified with the expression on the right hand side of (11) divided by s. Also, the index m is identified with $i_1$, and k will be index in the FFT domain after transforming each pulse. It is convenient to introduce the notation $$\hat{k} = \begin{cases} k, & k = 0, \dots, M/2-1 \\ k - M, & k = M/2, \dots M-1 \end{cases} \quad (14)$$

Thus, from (11), (12), and (14), the FFTed and pulse compressed pulses are to be multiplied by $$\exp\left\{j\frac{2\pi}{s}\frac{\hat{k}}{M}[R_G(t_p + n\Delta t) - R_G(0)]\right\}. \quad (15)$$

$$\exp\left\{j\frac{2\pi}{s}\frac{\hat{k}}{M}\left[V_0(i_2)(t_p + n\Delta t) + \frac{1}{2}A(i_3)(t_p^2 + 2t_p n\Delta t + (n\Delta t)^2)\right]\right\}$$

Multiplication by the expressions in (10) and (15) implement the necessary phase shifting and envelope shifting, respectively, for coherent integration. The number of velocity hypotheses, indexed by $i_2$, could be fairly large, and an efficient method is needed for running through these hypotheses. As described subsequently, this is accomplished by the Chirp-z Transform (CZT). There are also the acceleration hypotheses, indexed by $i_3$, to run through. For each value of $i_3$, the CZT will have to be performed anew; however, there is a savings in that the Fourier Transform of a deterministic function which is part of the CZT only has to be performed once. Relative efficiency is one of the considerations, but not the only consideration, when comparing the CZT method with other methods for what is essentially an interpolation problem.

The CZT will require that the velocity hypotheses $V_0(i_2)$ be equally spaced, but poses no other requirement on the spacing. The acceleration hypotheses $A(i_3)$ are also equally spaced. The hypotheses are of the form $$V_0(i_2) = \left(i_2 - \frac{N_2 - 1}{2}\right)\Delta V, \; i_2, 0, \ldots, N_2 - 1 \quad (16)$$

$$A(i_3) = \left(i_3 - \frac{N_3 - 1}{2}\right)\Delta A, \; i_3 = 0, \ldots, N_3 - 1 \quad (17)$$

Then combine (10) and (15), substitute using (16), and segregate pieces of the result according to which indices they depend upon. Hence, the result indicates that after multiplying for pulse compression one must multiply the data by $$\exp\left\{j\frac{4\pi}{\lambda}[R_G(t_p + n\Delta t) - R_G(t_p)]\right\} \quad (18)$$

$$\exp\left\{j\frac{2\pi}{s}\frac{\hat{k}}{M}[R_G(t_p + n\Delta t) - R_G(0)]\right\}.$$

$$\exp\left\{-j\frac{4\pi}{\lambda}\frac{N_2 - 1}{2}\Delta V \cdot n \cdot \Delta t\right\}\exp\left\{-j\frac{2\pi}{s}\frac{\hat{k}}{M}\frac{N_2 - 1}{2}\Delta V(t_p + n\Delta t)\right\}.$$

$$\exp\left\{j\frac{4\pi}{\lambda}A(i_3)t_p n\Delta t + \frac{2\pi}{\lambda}A(i_3)(n\Delta t)^2\right\}$$

$$\exp\left\{j\frac{2\pi}{s}\frac{\hat{k}}{M}\frac{1}{2}A(i_3)(t_p + n\Delta t)^2\right\}.$$

$$\exp\left\{j\frac{4\pi}{\lambda}i_2 n\Delta V\Delta t\right\}\exp\left\{j\frac{2\pi}{s}\frac{\hat{k}}{M}i_2 n\Delta V\Delta t\right\}.$$

$$\exp\left\{j\frac{2\pi}{s}\frac{\hat{k}}{M}i_2\Delta V t_p\right\}$$

On a line by line basis (18) is simplified further, yielding $$\exp\left\{j\frac{4\pi}{\lambda}[R_G(t_p + n\Delta t) - R_G(t_p)]\right\} \quad (19)$$

$$\exp\left\{j\frac{2\pi}{s}\frac{\hat{k}}{M}[R_G(t_p + n\Delta t) - R_G(0)]\right\}.$$

$$\exp\left\{-j2\pi(N_2 - 1)\Delta V\left[\frac{1}{\lambda}n\Delta t + \frac{\hat{k}}{2sM}(t_p + n\Delta t)\right]\right\}.$$

$$\exp\left\{j2\pi A(i_3)\left[\frac{1}{\lambda}n\Delta t(2t_p + n\Delta t) + \frac{\hat{k}}{2sM}(t_p + n\Delta t)^2\right]\right\}.$$

$$\exp\left\{j4\pi\Delta V\Delta t\left(\frac{1}{\lambda} + \frac{\hat{k}}{2sM}\right)i_2 n\right\}.$$

$$\exp\left\{j4\pi\Delta V t_p \frac{\hat{k}}{2sM}i_2\right\}$$

The sequence of steps implementing the multiplication by (19) is as follows and is also shown in FIG. 4:

1) (Lines 1 and 2 of (19)) Multiply by $$\exp\left\{j\frac{4\pi}{\lambda}\left[R_G(t_p + n\Delta t) - R_G(t_p) - \frac{N_2 - 1}{2}\Delta V \cdot n\Delta t\right]\right\}. \quad (20)$$

-continued $$\exp\left\{j\frac{2\pi}{s}\frac{\hat{k}}{M}\left[R_G(t_p + n\Delta t) - R_G(0) - \frac{N_2 - 1}{2}\Delta V(t_p + n\Delta t)\right]\right\}$$

for n=0, . . . ,N−1, and k=0, . . . ,M−1. This process accomplishes the phase and envelope shifts 408 illustrated in FIG. 4. Also, compute $$\text{fact}(n, k) = 2\pi\left[\frac{1}{\lambda}n\Delta t \cdot (2t_p + n\Delta t) + \frac{\hat{k}}{2sM}(t_p + n\Delta t)^2\right] \quad (21)$$

2) Compute $$W(k) = \exp\left[j2\pi\Delta V\Delta t\left(\frac{2}{\lambda} + \frac{\hat{k}}{sM}\right)\right] \quad (22)$$

for k=0, . . . ,M−1, and compute $$\text{FFT}\{W(k)^{-n^2/2}\} \quad (23)$$

where the sequence inside the FFT has been zero-padded by at least $N_2-1$ zeros to arrange for discarding wraparound in the convolution associated with the CZT in (25). This process is indicated in step 410 of FIG. 4.

3) For $i_3$=0, . . . ,$N_3$−1 do the following:

3a) (Line 3 of (19)) Multiply the output of step 1) by $$\exp[jA(i_3)\text{fact}(n,k)] \quad (24)$$

for n=0, . . . ,N−1, and k=0, . . . ,M−1, yielding a result of the form $F(k,n,i_3)$. This accomplishes the phase and envelope shifts for acceleration hypotheses $i_3$ as shown step 412 of FIG. 4.

3b) (Line 4 of (19)) Perform the transformation from the pulse index n to the velocity hypothesis index $i_2$ by means of the following CZT type computation (described more fully in the next paragraph):

$$G(k,i_2,i_3) = \sum_{n=0}^{N-1} F(k,n,i_3)W(k)^{i_2 n} \quad (25)$$

for k=0, . . . ,M−1, and $i_2$=0, . . . ,$N_2$−1, where W(k) is defined in (22). This accomplishes the Chirp-Z Transform for the velocity hypotheses as indicated in step 414 of FIG. 4.

3c) (Line 4 of (19)) Multiply $G(k,i_2,i_3)$ by $$F_2(p, k, i_2) = \exp\left(j2\pi\Delta V t_p \frac{\hat{k}}{sM}i_2\right) \quad (26)$$

for k=0, . . . ,M−1, and $i_2$=0, . . . ,$N_2$−1, and perform an IFFT with respect to k (block 416 of FIG. 4). This yields the desired output 418 of the coherent integration, $H(p,i_1,i_2,i_3)$.

The most FLOPS (floating point operations per second) intensive part of steps 1 through 3 is in the CZT of (25). To describe the computation involved, the right hand side of (25) may be written as $$\sum_{n=0}^{N-1} F(k,n,i_3)W(k)^{i_2 n} = W(k)^{i_2^2/2}\sum_{n=0}^{N-1} W(k)^{n^2/2}F(k,n,i_3)W(k)^{-(i_2-n)^2/2} \quad (27)$$

In (27) are seen two multiplications and a linear convolution. The latter operation incurs the majority of the FLOPS count and may be implemented by the usual FFT method. The data sequence and the deterministic sequence are each Fourier transformed after sufficient zero padding so that a linear convolution result may be extracted from the circular convolution result coming out of an inverse FFT. There is also a multiplication in the transform domain. The length of the padded sequences must be at least $N+N_2-1$, but one would typically want it to be a power of 2 or some other favorable composite number. One need compute the FFT of the deterministic sequence only once for the whole set of acceleration hypotheses, or perhaps the values could come from a database or some other method.

Regarding a FLOPS count comparison of CZT with other methods, there may be some additional cost as compared to polyphase filter interpolation, since the latter method is especially known for its efficiency. Also, one should take note that a special concern for polyphase filter interpolation is edge effects; that is, the quality of the FIR filter outputs at the beginning and end of data sequence may degrade, where less than the full number of true data points (i.e. not counting zero padding) contribute.

Another interesting method to compare with the methodology described herein is where the Keystone Transform is implemented "without interpolation," by using FFT methods instead, so this method avoids polyphase filters, in particular. The approximation that is used is that the digital Fourier Transform of a "chirp signal" has approximately the same mathematical form as a chirp signal, but the quality of this approximation suffers greatly as the length of the sequence being Fourier transformed decreases. Hence, this technique does not seem applicable to MTI.

An important driver for the FLOPS count is the number $N_3$ of acceleration hypotheses. This will of course depend on the maximum acceleration one wishes to model and on the spacing $\Delta A$ of the acceleration hypotheses. In turn, the maximum acceleration will probably depend on what is expected for physically realistic targets, as discussed earlier.

Now one must establish a basis for the value to set for $\Delta A$. This will be in terms of the straddling loss incurred by coherent integration. Later, for NCI, the issue of acceleration hypothesis spacing arises again in the context of straddling loss incurred during that processing. However, this will not alter the form of the processing decided for coherent integration. At most, it may affect the amount of straddling loss allocated to coherent integration, because straddling loss will also have to be allocated to NCI.

The length of a CPI is $$T_C = N \cdot \Delta t \tag{28}$$

in terms of the number of pulses in a CPI and the inter-pulse spacing. Actually, these could both change with the particular CPI, but that complication is not considered here. The standard velocity resolution for coherent integration is given by $$\frac{\lambda}{2T_C} \tag{29}$$

Assuming that the actual residual radial acceleration is within plus or minus the maximum value set for the acceleration hypotheses, the maximum acceleration mismatch is $\Delta A/2$. This will cause the nearest hypothetical velocity to the true velocity to drift during a CPI. If one wishes the drift to be no more than some specified fraction $\alpha$ of the velocity resolution in (27), e.g. $\alpha=\frac{1}{2}$, then one must have $$\Delta A \leq \alpha \frac{\lambda}{T_C^2} \tag{30}$$

For example, if $\alpha=\frac{1}{2}$, $\lambda=0.0316$, $T_C=0.1$, then $\Delta A \leq 1.58$ m/sec².

STAP is discussed only generally herein, since the focus is on coherent and non-coherent integration. The output of coherent integration is back in the range domain, as indicated by the IFFT 416 in FIG. 4. Moreover, the data is at the full range bandwidth since sub-band recombination has taken place before starting coherent integration, as indicated in FIG. 2, and the corresponding range resolution is in the data. However, as already mentioned, there is the alternative architecture that sub-band recombination would take place after STAP, in which case range resolution would be coarser during STAP.

There is input to STAP for each of the coarse acceleration hypotheses (indexed by $i_3$). The processing makes use of training data to form sample covariance estimates, which in turn are used to form weight vectors. In the processing without use of acceleration hypotheses, the training data are indexed by range and Doppler and ideally are chosen so as to exclude moving targets. In the case considered herein, the data indices are over range, velocity, and acceleration, but it would seem that for each index value $i_3$ the same set of range and velocity index values $i_1$ and $i_2$ can be used to select the training set, on the assumption that a suitable resolution cell is free of moving targets for all acceleration hypotheses. However, the data samples going into covariance estimation are altered by the particular acceleration hypothesis (See Step 3a above).

The question is whether the covariance estimation step has to be repeated in full for each coarse acceleration hypothesis. Actually, the numerical example of the previous section shows that the number of these acceleration hypotheses may in some cases be fairly small, and the processing load would accordingly be less burdensome. But the other answer to the question is that probably the sample covariance estimate has to be performed only once. This is for a zero acceleration hypothesis, since it has been demonstrated that clutter has relatively small acceleration compared to that expected for targets. For non-zero acceleration hypotheses, there is a smearing effect on the clutter covariance matrix, which it should be possible to model by a covariance matrix taper, in a similar way to that for frequency dispersion, among certain other phenomenological effects. This provides for a relatively cheap computation for the non-zero acceleration hypotheses.

The following section demonstrates that an increased set of acceleration hypotheses is required to counter straddling loss in non-coherent integration. However, it seems reasonable to redo STAP only for the coarse set of acceleration hypotheses, since the covariance matrix applies to a CPI of data.

Let the results of coherent integration be denoted by $H(p, i_1, i_2, i_3)$, where the indices reference the CPI number, range bin, velocity bin, and acceleration hypothesis, respectively. Then the simplest version of non-coherent integration (NCI) consists of summation of power over the CPIs, namely $$\Sigma_{p=0}^{P-1} |H(p, i_1, i_2, i_3)|^2 \tag{31}$$

But one must consider whether straddling losses arising from acceleration mismatches are sufficiently limited. Since the time duration of a dwell is greater than that of a CPI, there may be a greater migration through velocity resolution cells than was the case with coherent integration. Also, there is the migration through range resolution cells to consider. Hence, one must consider a different increment between acceleration hypotheses, say $\Delta A'$. Let $\beta$ denote some fraction of a velocity resolution cell that an actual velocity is allowed to migrate through due to acceleration mismatch, and let dwell time be denoted by $T_D$. Then $$\Delta A' \leq \beta \frac{\lambda}{T_C T_D} \quad (32)$$

Figure 5:
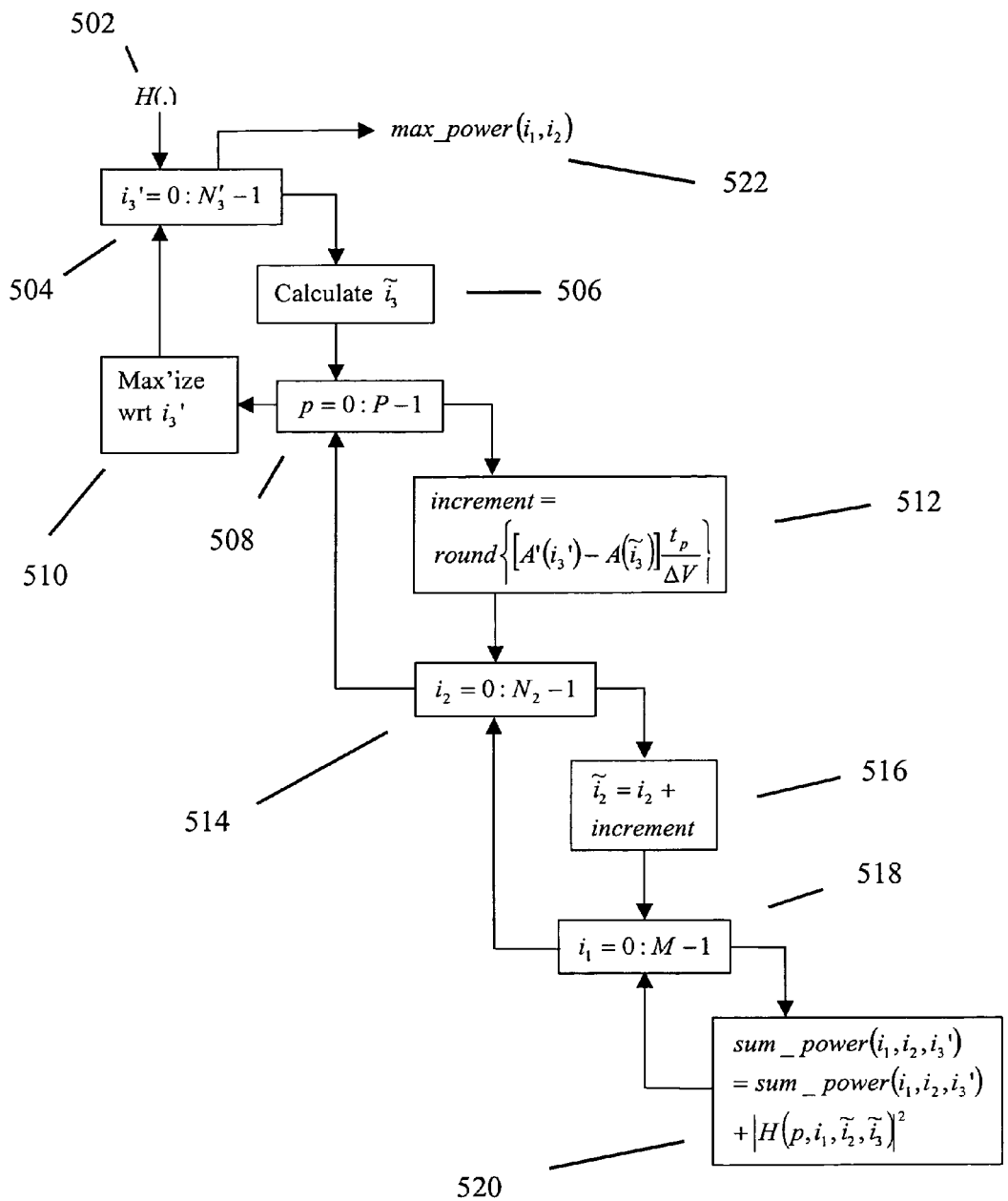
FIG. 5 is a flow chart for non-coherent integration.

Since $\beta$ should be about the same magnitude as $\alpha$, one generally will have $\Delta A' < \Delta A$. This might mean that one would increase the number of index values $i_3$ that the coherent integration algorithm has to run through. However, from a FLOPS count standpoint this could be unacceptable. One may adopt a different strategy for NCI instead. FIG. 5 is a flow chart depicting an iterative process for accomplishing non-coherent integration. First, introduce an increased number of acceleration hypotheses by the equation $$A'(i'_3) = \left(i'_3 - \frac{N'_3 - 1}{2}\right)\Delta A', \ i'_3 = 0, \ldots, N'_3 - 1 \quad (33)$$

These accelerations are integrated once and then twice, from $t=0$ to $t=t_p$, using the same grid of initial values for range and range rate at $t=0$ as was used for coherent integration, but with some of the acceleration values from (33) being different from those in (17). Hence, some of the range and range rate values arrived at for $t=t_p$ will be different from any of those arrived at previously during the coherent integration phase. But now the strategy is to match the desired range and range rate values as closely as possible by going back and choosing possibly different values $i_1, i_2, i_3$ appropriately. The summation for NCI is formally the same as (31), but with this understanding of what the index values represent.

To put some equations to this, first one matches the accelerations as closely as possible. From (17) and (33), this leads to the following choice for the acceleration index in (17):

$$\tilde{i}_3 = \frac{N_3 - 1}{2} + \text{round}\left[\left(i'_3 - \frac{N'_3 - 1}{2}\right)\frac{\Delta A'}{\Delta A}\right] \quad (34)$$

as illustrated in steps 502 through 506 of FIG. 5. Next, integrate the acceleration once and try to match velocities, leading to $$V_0(i_2) + A'(i_3')t_p \approx V_0(\tilde{i}_2) + A(\tilde{i}_3)t_p \quad (35)$$

which is to be solved for $\tilde{i}_2$. A solution is given by $$\tilde{i}_2 = i_2 + \text{round}\left\{[A'(i_3') - A(\tilde{i}_3)]\frac{t_p}{\Delta V}\right\} \quad (36)$$

as shown in steps 512 through 516 of FIG. 5.

Integrate again and try to match ranges, leading to $$R_0(i_1) + V_0(i_2)t_p + \frac{1}{2}A'(i_3')t_p^2 \approx R_0(\tilde{i}_1) + V_0(\tilde{i}_2)t_p + \frac{1}{2}A(\tilde{i}_3)t_p^2 \quad (37)$$

which is to be solved for $\tilde{i}_1$. A solution is given by $$\tilde{i}_1 = i_1 + \text{round}\left\{\left[(i_2 - \tilde{i}_2)\Delta V + (A'(i_3') - A(\tilde{i}_3))\frac{t_p}{2}\right]\frac{t_p}{s}\right\} \quad (38)$$

where $s$ is the range sample spacing. Actually, if one examines typical magnitudes for parameter values in (38) one will observe that the second term on the right hand side of (38) should be 0, yielding $$\tilde{i}_1 = i_1 \quad (39)$$

Equation (31) for NCI is then replaced by $$\Sigma_{p=0}^{P-1}|H(p, i_1, \tilde{i}_2, \tilde{i}_3)|^2 \quad (40)$$

which is a summation of power over the CPIs, as shown in step 520. It seems desirable to reduce the dimensionality of the output expressed by (40), so that one may deal only with range and velocity indices. One way to do this is to calculate the maximum of (40) with respect to the acceleration hypothesis. This gives $$\text{max\_power}(i_1, i_2) = \max_{i_3} \Sigma_{p=0}^{P-1}|H(p, i_1, \tilde{i}_2, \tilde{i}_3)|^2 \quad (41)$$

as indicated at 522, after iterating back through steps 518, 514, and 510.

The steps or operations described herein are intended as examples. There may be many variations to these steps or operations without departing from the spirit of the invention. For instance, the steps may be performed in a differing order, or steps may be added, deleted, or modified.

Although examples of implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. The processes described herein may be performed using DSPs (digital signal processors) and one or more associated microcomputers, utilizing stored programs accessed from memory devices such as hard disk systems, optical disks, or semiconductor memory, for example.

What is claimed is:

1. A method for processing pulses within a CPI for SMTI radar, the method comprising the steps of:
   (a) determining Fast Fourier Transform (FFT) for each pulse;
   (b) multiplying the FFT by a pulse compression reference function;
   (c) shifting phase of the pulse-compressed FFT by applying a first factor derived from a ground reference point and a second factor derived from a velocity-acceleration hypothesis to provide phase-shifted data;
   (d) shifting envelope of the phase-shifted data by applying one factor derived from range history and a second factor derived from a velocity-acceleration hypothesis to provide aligned data; and (e) determining Inverse FFT for the aligned data to provide a set of target data of the form $H(p,i_1,i_2,i_3)$, where p is CPI number, $i_1$ is range index, $i_2$ is velocity index, and $i_3$ is coarse acceleration index.

2. The method in accordance with claim 1, wherein the SMTI radar has a characteristic transmitted chirp waveform, and the step (b) of multiplying the FFT by a pulse compression reference function further comprises the steps of determining a transfer function of the transmitted chirp waveform, determining a conjugate of the transfer function, and multiplying the FFT by the conjugate of the transfer function of the transmitted chirp waveform.

3. The method in accordance with claim 1, wherein pulse number is indexed by n, and wherein the step (c) of shifting phase of the pulse-compressed FFT by applying a first factor derived from a ground reference point and a second factor derived from a velocity-acceleration hypothesis to provide phase-shifted data further comprises the step of:

multiplying the $n^{th}$ pulse in the frequency domain, after multiplication by the pulse compression reference function, by $$\exp\left\{j\frac{4\pi}{\lambda}[R_G(t_p+n\Delta t) - R_G(t_p)]\right\}\exp\left\{j\frac{4\pi}{\lambda}\left([V_0(i_2)+A(i_3)t_p]n\Delta t + \frac{1}{2}A(i_3)(n\Delta t)^2\right)\right\}$$

where:
$R_G(t)$ represents range history of a GRP;
$V_0(i_2)$ represents a velocity hypothesis; and
$A(i_3)$ represents a range acceleration hypothesis.

4. The method in accordance with claim 3, wherein the step (d) of shifting envelope of the phase-shifted data by applying one factor derived from range history and a second factor derived from a velocity-acceleration hypothesis to provide aligned data further comprises the step of:

multiplying the phase-shifted data by:

$$\exp\left\{j\frac{2\pi}{s}\frac{\hat{k}}{M}[R_G(t_p+n\Delta t) - R_G(0)]\right\} \cdot \exp\left\{j\frac{2\pi}{s}\frac{\hat{k}}{M}\left[V_0(i_2)(t_p+n\Delta t) + \frac{1}{2}A(i_3)(t_p^2+2t_p n\Delta t+(n\Delta t)^2)\right]\right\}$$

where:
s represents range sampling interval;
$R_G(t)$ represents range history of a GRP;
M represents number of samples;

$$\hat{k} = \begin{cases} k, & k=0,\ldots,M/2-1 \\ k-M, & k=M/2,\ldots M-1 \end{cases};$$

$V_0(i_2)$ represents a velocity hypothesis;
$A(i_3)$ represents a range acceleration hypothesis.

5. The method in accordance with claim 4, further comprising the steps of:

selecting a set of velocity hypotheses given by $$V_0(i_2) = \left(i_2 - \frac{N_2-1}{2}\right)\Delta V, \; i_2 = 0,\ldots,N_2-1;$$

and
selecting a set of acceleration hypotheses given by $$A(i_3) = \left(i_3 - \frac{N_3-1}{2}\right)\Delta A, \; i_3 = 0,\ldots,N_3-1.$$

6. The method in accordance with claim 5, further comprising the step of:

multiplying the pulse-compressed FFT by $$\exp\left\{j\frac{4\pi}{\lambda}\left[R_G(t_p+n\Delta t) - R_G(t_p) - \frac{N_2-1}{2}\Delta V \cdot n\Delta t\right]\right\}.$$

$$\exp\left\{j\frac{2\pi}{s}\frac{\hat{k}}{M}\left[R_G(t_p+n\Delta t) - R_G(0) - \frac{N_2-1}{2}\Delta V(t_p+n\Delta t)\right]\right\}$$

where:
M represents number of samples; and $$\hat{k} = \begin{cases} k, & k=0,\ldots,M/2-1 \\ k-M, & k=M/2,\ldots M-1 \end{cases}.$$

7. The method in accordance with claim 6, further comprising the steps of:

determining $$\text{fact}(n,k) = 2\pi\left[\frac{1}{\lambda}n\Delta t \cdot (2t_p+n\Delta t) + \frac{\hat{k}}{2sM}(t_p+n\Delta t)^2\right]$$

for n=0, . . . ,N−1, and k=0, . . . ,M−1; and
determining $$W(k) = \exp\left[j2\pi\Delta V\Delta t\left(\frac{2}{\lambda} + \frac{\hat{k}}{sM}\right)\right]$$

for k=0, . . . ,M−1, and
FFT$\{W(k)^{-n^2/2}\}$.

8. The method in accordance with claim 7, further comprising the steps of:

for $i_3$=0, . . . ,$N_3$−1, performing the following operations:
(a) multiply the result of the multiplication of claim 6 by $$\exp[jA(i_3)\text{fact}(n,k)]$$

for n=0, . . . ,N−1, and k=0, . . . ,M−1, yielding a result of the form $F(k,n,i_3)$;
(b) perform a transformation from the pulse index n to the velocity hypothesis index $i_2$ by a Chirp-Z Transform computation comprising:

$$G(k,i_2,i_3) = \sum_{n=0}^{N-1} F(k,n,i_3)W(k)^{i_2 n}$$

for k=0, . . . ,M−1, and $i_2$=0, . . . ,$N_2$−1; and (c) multiply $G(k,i_2,i_3)$ by $$\exp\left(j2\pi\Delta V t_p \frac{\hat{k}}{sM} i_2\right)$$

for $k=0,\ldots,M-1$, and $i_2=0,\ldots,N_2-1$; and (d) perform an IFFT with respect to k to yield an output of the form $H(p,i_1,i_2,i_3)$.

9. A method for processing pulses within a CPI for SMTI radar, wherein the SMTI radar has a characteristic transmitted chirp waveform, the method comprising the steps of:

(a) determining Fast Fourier Transform (FFT) for each pulse;

(b) multiplying the FFT by a pulse compression reference function to provide a pulse-compressed FFT by:
  determining a transfer function of the transmitted chirp waveform;
  determining a conjugate of the transfer function; and
  multiplying the FFT by the conjugate of the transfer function of the transmitted chirp waveform;

(c) selecting a set of velocity hypotheses given by $$V_0(i_2) = \left(i_2 - \frac{N_2-1}{2}\right)\Delta V, \ i_2 = 0,\ldots,N_2-1$$

and selecting a set of acceleration hypotheses given by $$A(i_3) = \left(i_3 - \frac{N_3-1}{2}\right)\Delta A, \ i_3 = 0,\ldots,N_3-1;$$

(d) multiplying the pulse-compressed FFT by $$\exp\left\{j\frac{4\pi}{\lambda}\left[R_G(t_p+n\Delta t) - R_G(t_p) - \frac{N_2-1}{2}\Delta V \cdot n\Delta t\right]\right\} \cdot$$

$$\exp\left\{j\frac{2\pi}{s}\frac{\hat{k}}{M}\left[R_G(t_p+n\Delta t) - R_G(0) - \frac{N_2-1}{2}\Delta V(t_p+n\Delta t)\right]\right\}$$

where:

M represents number of samples; and $$\hat{k} = \begin{cases} k, & k = 0,\ldots,M/2-1 \\ k-M, & k = M/2,\ldots M-1 \end{cases};$$

(e) determining $$\text{fact}(n,k) = 2\pi\left[\frac{1}{\lambda}n\Delta t\cdot(2t_p+n\Delta t) + \frac{\hat{k}}{2sM}(t_p+n\Delta t)^2\right]$$

for $n=0,\ldots,N-1$, and $k=0,\ldots,M-1$;

(f) determining $$W(k) = \exp\left[j2\pi\Delta V\Delta t\left(\frac{2}{\lambda} + \frac{\hat{k}}{sM}\right)\right]$$

for $k=0,\ldots,M-1$, and
$\text{FFT}\{W(k)^{-n^2/2}\}$;

(g) for $i_3=0,\ldots,N_3-1$, performing the following operations:

(1) multiply the result of step (d) by $\exp[jA(i_3)\text{fact}(n,k)]$ for $n=0,\ldots,N-1$, and $k=0,\ldots,M-1$, yielding a result of the form $F(k,n,i_3)$;

(2) perform a transformation from the pulse index n to the velocity hypothesis index $i_2$ by a Chirp-Z Transform computation comprising:

$G(k,i_2,i_3) = \sum_{n=0}^{N-1} F(k,n,i_3)W(k)^{i_2 n}$ for $k=0,\ldots,M-1$, and $i_2=0,\ldots,N_2-1$;

(3) multiply $G(k,i_2,i_3)$ by $$\exp\left(j2\pi\Delta V t_p \frac{\hat{k}}{sM} i_2\right)$$

for $k=0,\ldots,M-1$, and $i_2=0,\ldots,N_2-1$; and (4) perform an IFFT with respect to k to yield an output of the form $H(p,i_1,i_2,i_3)$, where p is CPI number, $i_1$ is range index, $i_2$ is velocity index, and $i_3$ is coarse acceleration index.

10. A method for processing radar data over a dwell of CPIs for SMTI radar, the method comprising the steps of:

(a) performing coherent integration for each CPI within the dwell to provide an output of the form $H(p,i_1,i_2,i_3)$, where p is CPI number, $i_1$ is range index, $i_2$ is velocity index, and $i_3$ is coarse acceleration index;

(b) establishing an increment value $\Delta A'$ between acceleration hypotheses such that $$\Delta A' \leq \beta\frac{\lambda}{T_C T_D}$$

where:

β denotes a fraction of a velocity resolution cell that an actual velocity is allowed to migrate through due to acceleration mismatch;

$T_D$ denotes dwell time; and $T_C$ denotes length of a CPI;

(c) introducing an increased number of acceleration hypotheses corresponding to $$A'(i_3') = \left(i_3' - \frac{N_3'-1}{2}\right)\Delta A', \ i_3' = 0,\ldots,N_3'-1$$

where:

$i_3'$ denotes an index associated with the increased number of acceleration hypotheses; and $N_3'$ denotes total number of increased acceleration hypotheses;

(d) choosing an acceleration index according to the relation $$\tilde{i}_3 = \frac{N_3 - 1}{2} + \text{round}\left[\left(i'_3 - \frac{N'_3 - 1}{2}\right)\frac{\Delta A'}{\Delta A}\right];$$

(e) choosing a velocity hypothesis index according to the relation $$\tilde{i}_2 = i_2 + \text{round}\left\{[A'(i'_3) - A(\tilde{i}_3)]\frac{t_p}{\Delta V}\right\};$$

(f) summing power over all CPIs in the dwell to complete the NCI process through the relation $$\Sigma_{p=0}^{P-1} |H(p,i_1,\tilde{i}_2,\tilde{i}_3)|^2;$$

where:
P is the total number of CPIs in the dwell.

11. The method in accordance with claim 10, further comprising reducing dimensionality of NCI output by computing a maximum with respect to the acceleration hypothesis according to the following relation:

$$\text{max\_power}(i_1, i_2) = \max_{i_3} \Sigma_{p=0}^{P-1} |H(p, i_1, \tilde{i}_2, \tilde{i}_3)|^2.$$

12. The method in accordance with claim 10, wherein the step (a) of performing coherent integration for each CPI within the dwell further comprises the steps of:
  (a) determining Fast Fourier Transform (FFT) for each pulse;
  (b) multiplying the FFT by a pulse compression reference function;
  (c) shifting phase of the pulse-compressed FFT by applying a first factor derived from a ground reference point and a second factor derived from a velocity-acceleration hypothesis to provide phase-shifted data;
  (d) shifting envelope of the phase-shifted data by applying one factor derived from range history and a second factor derived from a velocity-acceleration hypothesis to provide aligned data; and
  (e) determining Inverse FFT for the aligned data to provide a set of target data of the form $H(p,i_1,i_2,i_3)$, where p is CPI number, $i_1$ is range index, $i_2$ is velocity index, and $i_3$ is coarse acceleration index.

13. The method in accordance with claim 12, wherein the SMTI radar has a characteristic transmitted chirp waveform, and the step (b) of multiplying the FFT by a pulse compression reference function further comprises the steps of determining a transfer function of the transmitted chirp waveform, determining a conjugate of the transfer function, and multiplying the FFT by the conjugate of the transfer function of the transmitted chirp waveform.

14. The method in accordance with claim 12, wherein performing coherent integration for each CPI within the dwell further comprises the steps of:
selecting a set of velocity hypotheses given by $$V_0(i_2) = \left(i_2 - \frac{N_2 - 1}{2}\right)\Delta V, i_2 = 0, \ldots, N_2 - 1;$$

and
selecting a set of acceleration hypotheses given by $$A(i_3) = \left(i_3 - \frac{N_3 - 1}{2}\right)\Delta A, i_3 = 0, \ldots, N_3 - 1.$$

15. The method in accordance with claim 12, further comprising the step of:
multiplying the pulse-compressed FFT by $$\exp\left\{j\frac{4\pi}{\lambda}\left[R_G(t_p + n\Delta t) - R_G(t_p) - \frac{N_2 - 1}{2}\Delta V \cdot n\Delta t\right]\right\} \cdot \exp$$

$$\left\{j\frac{2\pi}{s}\frac{\hat{k}}{M}\left[R_G(t_p + n\Delta t) - R_G(0) - \frac{N_2 - 1}{2}\Delta V(t_p + n\Delta t)\right]\right\}$$

where:
M represents number of samples; and $$\hat{k} = \begin{cases} k, & k = 0, \ldots, M/2 - 1 \\ k - M, & k = M/2, \ldots M - 1 \end{cases}.$$

16. The method in accordance with claim 15, further comprising the steps of:
determining $$\text{fact}(n, k) = 2\pi\left[\frac{1}{\lambda}n\Delta t \cdot (2t_p + n\Delta t) + \frac{\hat{k}}{2sM}(t_p + n\Delta t)^2\right]$$

for $n=0, \ldots, N-1$, and $k=0, \ldots, M-1$; and
determining $$W(k) = \exp\left[j2\pi\Delta V\Delta t\left(\frac{2}{\lambda} + \frac{\hat{k}}{sM}\right)\right]$$

for $k=0, \ldots, M-1$, and
$FFT\{W(k)^{-n^2/2}\}$.

17. The method in accordance with claim 16, further comprising the steps of:
for $i_3=0, \ldots, N_3-1$, performing the following operations:
  (a) multiply the result of the multiplication of claim 15 by $$\exp[jA(i_3)\text{fact}(n,k)]$$

for $n=0, \ldots, N-1$, and $k=0, \ldots, M-1$, yielding a result of the form $F(k,n,i_3)$;
  (b) perform a transformation from the pulse index n to the velocity hypothesis index $i_2$ by a Chirp-Z Transform computation comprising:

$$G(k,i_2,i_3) = \Sigma_{n=0}^{N-1} F(k,n,i_3) W(k)^{i_2 n}$$

for $k=0, \ldots, M-1$, and $i_2=0, \ldots, N_2-1$; and
  (c) multiply $G(k,i_2,i_3)$ by $$\exp\left(j2\pi\Delta V t_p \frac{\hat{k}}{sM} i_2\right)$$

for $k=0, \ldots, M-1$, and $i_2=0, \ldots, N_2-1$; and (d) perform an IFFT with respect to k to yield an output of the form $H(p,i_1,i_2,i_3)$.

18. An SMTI radar system for processing radar data over a dwell of CPIs comprising:
means for performing coherent integration for each CPI within the dwell to provide an output of the form $H(p, i_1, i_2, i_3)$, where p is CPI number, $i_1$ is range index, $i_2$ is velocity index, and $i_3$ is coarse acceleration index;
means for establishing an increment value $\Delta A'$ between acceleration hypotheses such that $$\Delta A' \leq \beta \frac{\lambda}{T_C T_D}$$

where:
$\beta$ denotes a fraction of a velocity resolution cell that an actual velocity is allowed to migrate through due to acceleration mismatch;
$T_D$ denotes dwell time; and
$T_C$ denotes length of a CPI;
means for introducing an increased number of acceleration hypotheses corresponding to $$A'(i_3') = \left(i_3' - \frac{N_3' - 1}{2}\right)\Delta A', i_3' = 0, \ldots, N_3' - 1$$

where:
$i_3'$ denotes an index associated with the increased number of acceleration hypotheses; and
$N_3'$ denotes total number of increased acceleration hypotheses;
means for choosing an acceleration index according to the relation $$\tilde{i}_3 = \frac{N_3 - 1}{2} + \text{round}\left[\left(i_3' - \frac{N_3' - 1}{2}\right)\frac{\Delta A'}{\Delta A}\right];$$

means for choosing a velocity hypothesis index according to the relation $$\tilde{i}_2 = i_2 + \text{round}\left\{[A'(i_3') - A(\tilde{i}_3)]\frac{t_p}{\Delta V}\right\};$$

means for summing power over all CPIs in the dwell to complete the NCI process through the relation $$\Sigma_{p=0}^{P-1}|H(p,i_1,\tilde{i}_2,\tilde{i}_3)|^2;$$

where:
P is the total number of CPIs in the dwell.

19. The SMTI radar system of claim 18, further comprising means for reducing dimensionality of NCI output by means for computing a maximum with respect to the acceleration hypothesis according to the following relation:

$$\text{max\_power}(i_1,i_2) = \max_{i_3} \Sigma_{p=0}^{P-1}|H(p,i_1,\tilde{i}_2,\tilde{i}_3)|^2.$$

20. The SMTI radar system of claim 18, wherein the means for performing coherent integration for each CPI within the dwell further comprises:

means for selecting a set of velocity hypotheses given by $$V_0(i_2) = \left(i_2 - \frac{N_2 - 1}{2}\right)\Delta V, i_2 = 0, \ldots, N_2 - 1;$$

and
means for selecting a set of acceleration hypotheses given by $$A(i_3) = \left(i_3 - \frac{N_3 - 1}{2}\right)\Delta A, i_3 = 0, \ldots, N_3 - 1.$$

21. The SMTI radar system of claim 20, further comprising:
means for multiplying the pulse-compressed FFT by $$\exp\left\{j\frac{4\pi}{\lambda}\left[R_G(t_p + n\Delta t) - R_G(t_p) - \frac{N_2 - 1}{2}\Delta V \cdot n\Delta t\right]\right\} \cdot \exp$$

$$\left\{j\frac{2\pi}{s}\frac{\hat{k}}{M}\left[R_G(t_p + n\Delta t) - R_G(0) - \frac{N_2 - 1}{2}\Delta V(t_p + n\Delta t)\right]\right\}$$

where:
M represents number of samples; and $$\hat{k} = \begin{cases} k, & k = 0, \ldots, M/2 - 1 \\ k - M, & k = M/2, \ldots M - 1 \end{cases}.$$

22. The SMTI radar system of claim 21, further comprising:
means for determining $$\text{fact}(n, k) = 2\pi\left[\frac{1}{\lambda}n\Delta t \cdot (2t_p + n\Delta t) + \frac{\hat{k}}{2sM}(t_p + n\Delta t)^2\right]$$

for n=0, . . . ,N−1, and k=0, . . . ,M−1; and
means for determining $$W(k) = \exp\left[j2\pi\Delta V\Delta t\left(\frac{2}{\lambda} + \frac{\hat{k}}{sM}\right)\right]$$

for k=0, . . . ,M−1, and
FFT{W(k)$^{-n^2/2}$}.

23. The SMTI radar system of claim 22, further comprising:
for $i_3$=0, . . . ,$N_3$−1:
means for multiplying the result of the multiplication of claim 21 by exp [jA($i_3$)fact(n,k)]

for n=0, . . . ,N−1, and k=0, . . . ,M−1, yielding a result of the form F(k,n,$i_3$);
means for performing a transformation from the pulse index n to the velocity hypothesis index $i_2$ by a Chirp-Z Transform computation comprising:

$$G(k,i_2,i_3) = \Sigma_{n=0}^{N-1} F(k,n,i_3) W(k)^{i_2 n}$$

for k=0, ... ,M−1, and $i_2$=0, ... ,$N_2$−1; and means for multiplying $G(k,i_2,i_3)$ by $$\exp\left(j2\pi\Delta V t_p \frac{\hat{k}}{sM} i_2\right)$$

for k=0, ... ,M−1, and $i_2$=0, ... ,$N_2$−1; and
means for performing an IFFT with respect to k to yield an output of the form $H(p,i_1,i_2,i_3)$.

24. A method for processing radar return pulse data over a dwell of CPIs for SMTI radar, the method comprising the steps of:

(a) determining Fast Fourier Transform (FFT) for each pulse;

(b) multiplying the FFT by a pulse compression reference function to provide a pulse-compressed FFT by:
determining a transfer function of the transmitted chirp waveform;
determining a conjugate of the transfer function; and
multiplying the FFT by the conjugate of the transfer function of the transmitted chirp waveform;

(c) selecting a set of velocity hypotheses given by $$V_0(i_2) = \left(i_2 - \frac{N_2 - 1}{2}\right)\Delta V,$$
$$i_2 = 0, \ldots, N_2 - 1$$

and selecting a set of acceleration hypotheses given by $$A(i_3) = \left(i_3 - \frac{N_3 - 1}{2}\right)\Delta A,$$
$$i_3 = 0, \ldots, N_3 - 1;$$

(d) multiplying the pulse-compressed FFT by $$\exp\left\{j\frac{4\pi}{\lambda}\left[R_G(t_p + n\Delta t) - R_G(t_p) - \frac{N_2 - 1}{2}\Delta V \cdot n\Delta t\right]\right\} \cdot \exp\left\{j\frac{2\pi}{s}\frac{\hat{k}}{M}\left[R_G(t_p + n\Delta t) - R_G(0) - \frac{N_2 - 1}{2}\Delta V(t_p + n\Delta t)\right]\right\}$$

where:
M represents number of samples; and $$\hat{k} = \begin{cases} k, & k = 0, \ldots, M/2 - 1 \\ k - M, & k = M/2, \ldots M - 1 \end{cases};$$

(e) determining $$\text{fact}(n, k) = 2\pi\left[\frac{1}{\lambda} n\Delta t \cdot (2t_p + n\Delta t) + \frac{\hat{k}}{2sM}(t_p + n\Delta t)^2\right]$$

for n=0, ... ,N−1, and k=0, ... ,M−1;

(f) determining $$W(k) = \exp\left[j2\pi\Delta V\Delta t\left(\frac{2}{\lambda} + \frac{\hat{k}}{sM}\right)\right]$$

for k=0, ... ,M−1, and
$FFT\{W(k)^{-n^2/2}\}$;

(g) for $i_3$=0, ... ,$N_3$−1, performing the following operations:
(1) multiply the result of step (d) by $\exp[jA(i_3)\text{fact}(n,k)]$ for n=0, ... ,N−1, and k=0, ... ,M−1, yielding a result of the form $F(k,n,i_3)$;

(2) perform a transformation from the pulse index n to the velocity hypothesis index $i_2$ by a Chirp-Z Transform computation comprising:

$G(k,i_2,i_3) = \sum_{n=0}^{N-1} F(k,n,i_3) W(k)^{i_2 n}$ for k=0, ... ,M−1, and $i_2$=0, ... ,$N_2$−1;
(3) multiply $G(k,i_2,i_3)$ by $$\exp\left(j2\pi\Delta V t_p \frac{\hat{k}}{sM} i_2\right)$$

for k=0, ... ,M−1, and $i_2$=0, ... ,$N_2$−1; and
(4) perform an IFFT with respect to k to yield an output of the form $H(p,i_1,i_2,i_3)$, where p is CPI number, $i_1$ is range index, $i_2$ is velocity index, and $i_3$ is coarse acceleration index;

(h) establishing an increment value $\Delta A'$ between acceleration hypotheses such that $$\Delta A' \leq \beta \frac{\lambda}{T_C T_D}$$

where:
$\beta$ denotes a fraction of a velocity resolution cell that an actual velocity is allowed to migrate through due to acceleration mismatch;
$T_D$ denotes dwell time; and
$T_C$ denotes length of a CPI;

(i) introducing an increased number of acceleration hypotheses corresponding to $$A'(i_3') = \left(i_3' - \frac{N_3' - 1}{2}\right)\Delta A',$$
$$i_3' = 0, \ldots, N_3' - 1$$

where:
$i_3'$ denotes an index associated with the increased number of acceleration hypotheses; and
$N_3'$ denotes total number of increased acceleration hypotheses;

(j) choosing an acceleration index according to the relation $$\tilde{i}_3 = \frac{N_3 - 1}{2} + \text{round}\left[\left(i_3' - \frac{N_3' - 1}{2}\right)\frac{\Delta A'}{\Delta A}\right];$$

(e) choosing a velocity hypothesis index according to the relation $$\tilde{i}_2 = i_2 + \text{round}\left\{[A'(i'_3) - A(\tilde{i}_3)]\frac{t_p}{\Delta V}\right\};$$

(k) summing power over all CPIs in the dwell to complete the NCI process through the relation $$\Sigma_{p=0}^{P-1}|H(p,i_1,\tilde{i}_2,\tilde{i}_3)|^2;$$

where:

P is the total number of CPIs in the dwell.

25. The method in accordance with claim 24, further comprising reducing dimensionality of NCI output by computing a maximum with respect to the acceleration hypothesis according to the following relation:

$$\text{max\_power}(i_1,i_2) = \max_{i_3}\Sigma_{p=0}^{P-1}|H(p,i_1,\tilde{i}_2,\tilde{i}_3)|^2.$$

* * * * *